(12) United States Patent
Tanaka

(10) Patent No.: US 12,257,704 B2
(45) Date of Patent: Mar. 25, 2025

(54) ABNORMALITY DETECTION DEVICE AND ABNORMALITY DETECTION METHOD

(71) Applicant: Nissan Motor Co., Ltd., Yokohama (JP)

(72) Inventor: Yasuhiro Tanaka, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 228 days.

(21) Appl. No.: 17/437,922

(22) PCT Filed: Mar. 27, 2019

(86) PCT No.: PCT/JP2019/013342
§ 371 (c)(1),
(2) Date: Sep. 10, 2021

(87) PCT Pub. No.: WO2020/194597
PCT Pub. Date: Oct. 1, 2020

(65) Prior Publication Data
US 2022/0126461 A1   Apr. 28, 2022

(51) Int. Cl.
*B25J 19/06* (2006.01)
*B25J 9/16* (2006.01)
(Continued)

(52) U.S. Cl.
CPC ............. *B25J 19/06* (2013.01); *B25J 9/1633* (2013.01); *G01L 5/0061* (2013.01); *G05B 23/0232* (2013.01)

(58) Field of Classification Search
CPC ........ B25J 19/06; B25J 9/1633; B25J 9/1674; B25J 9/1653; G05B 23/02;
(Continued)

(56) References Cited

U.S. PATENT DOCUMENTS 4,337,516 A * 6/1982 Murphy ............. G01R 19/0038
  702/183
2003/0184348 A1* 10/2003 Lee ...................... H03K 5/2472
  327/100
(Continued)

FOREIGN PATENT DOCUMENTS

EP  3 290 675 A1   3/2018
JP  58-222311 A   12/1983
(Continued)

OTHER PUBLICATIONS

Tanaka et al., "The Failure Prediction for Robot Reducer by Machine Learning", Transactions of Society of Automotive Engineers of Japan, Mar. 25, 2019, pp. 585-590, vol. 50 Issue No. 2, Society of Automotive Engineers of Japan, Japan.
(Continued)

*Primary Examiner* — Yoshihisa Ishizuka
*Assistant Examiner* — Carter W Ferrell
(74) *Attorney, Agent, or Firm* — Global IP Counselors, LLP

(57) ABSTRACT

An abnormality detection device detects an abnormality of a device based on time-series data acquired from a device having a movable part. The abnormality determination device determines whether time-series data at a specific time have increased or decreased with respect to time-series data from a certain time prior to the specific time as the specific time is shifted, indicates an increase or decrease of the time-series data by defined numerical values, and detects an abnormality of the device based on integrated values obtained by integrating the defined numerical values.

18 Claims, 9 Drawing Sheets

(51) Int. Cl.
*G01L 5/00* (2006.01)
*G05B 23/02* (2006.01)

(58) Field of Classification Search
CPC .............. G05B 19/4065; G05B 19/406; G05B 2219/37624; G05B 2219/39355; G05B 19/4062; G05B 2219/37525; G05B 23/0235; G05B 23/0232; G01L 5/0061
See application file for complete search history.

(56) References Cited

U.S. PATENT DOCUMENTS

| | | | | |
|---|---|---|---|---|
| 2012/0065781 | A1* | 3/2012 | Ikeda | B25J 9/1674 700/261 |
| 2018/0147735 | A1* | 5/2018 | Kuno | G01L 5/0076 |
| 2018/0245987 | A1* | 8/2018 | Mizoguchi | G06F 17/15 |
| 2019/0137984 | A1* | 5/2019 | Maekawa | G06N 5/046 |
| 2019/0210176 | A1* | 7/2019 | Yamamoto | G05B 23/0254 |
| 2019/0258229 | A1* | 8/2019 | Oho | G05B 19/4155 |
| 2019/0369598 | A1* | 12/2019 | Kubo | G06N 7/01 |

FOREIGN PATENT DOCUMENTS

| | | |
|---|---|---|
| JP | 7-11472 B2 | 2/1995 |
| JP | 9-174482 A | 7/1997 |
| WO | 2018/030033 A1 | 2/2018 |
| WO | 2018/079075 A1 | 5/2018 |

OTHER PUBLICATIONS

Chinese Office Action of Nov. 8, 2023 of corresponding Chinese Patent Application No. 201980094849.0.

* cited by examiner

ABNORMALITY DETECTION DEVICE AND ABNORMALITY DETECTION METHOD

CROSS-REFERENCE TO RELATED APPLICATIONS

This application is a U.S. national stage application of International Application No. PCT/JP2019/013342, filed on Mar. 27, 2019.

BACKGROUND

Technical Field

The present invention relates to an abnormality detection device and an abnormality detection method.

Background Information

An abnormality determination device for an articulated robot disclosed in Patent Document 1 is known from the prior art. In Japanese Laid-Open Patent Application No. 9-174482 (Patent Document 1), the movement position of a robot joint axis and disturbance torque applied to the joint axis are detected at a prescribed cycle during operation of the robot, and an average value of the disturbance torque for each detected movement position is calculated. The calculated average value is then compared with a prescribed threshold, and the robot is determined to be abnormal when the average value exceeds the threshold.

SUMMARY

The value of the disturbance torque will vary significantly due to various factors. Since the threshold is set to a fixed value, if the range of variation of the disturbance torque is narrow, an abnormality or the indication of an abnormality may be overlooked. On the other hand, if the threshold is set to a low value in order to avoid such occurrences, a normally operating robot will be erroneously determined to be abnormal.

Given the problem described above, an object of the present invention is to provide an abnormality detection device and an abnormality detection method that accurately detect an abnormality of a device from time-series data that change continuously, regardless of the width of the range of fluctuation.

One aspect of the present invention is an abnormality detection device that detects an abnormality of a device based on time-series data acquired from a device having a movable part. The abnormality determination device determines whether time-series data at a specific time have increased or decreased with respect to time-series data from a certain time prior to the specific time as the specific time is shifted, indicates the increase or decrease of the time-series data by defined numerical values, and detects an abnormality of a device based on the integrated value obtained by integration of the defined numerical values.

According to one aspect of the present invention, it is possible to accurately detect an abnormality of a device from time-series data that change continuously regardless of the width of the range of fluctuation.

BRIEF DESCRIPTION OF THE DRAWINGS

Referring now to the attached drawings which form a part of this original disclosure.

DETAILED DESCRIPTION OF EMBODIMENTS

Figure 1:
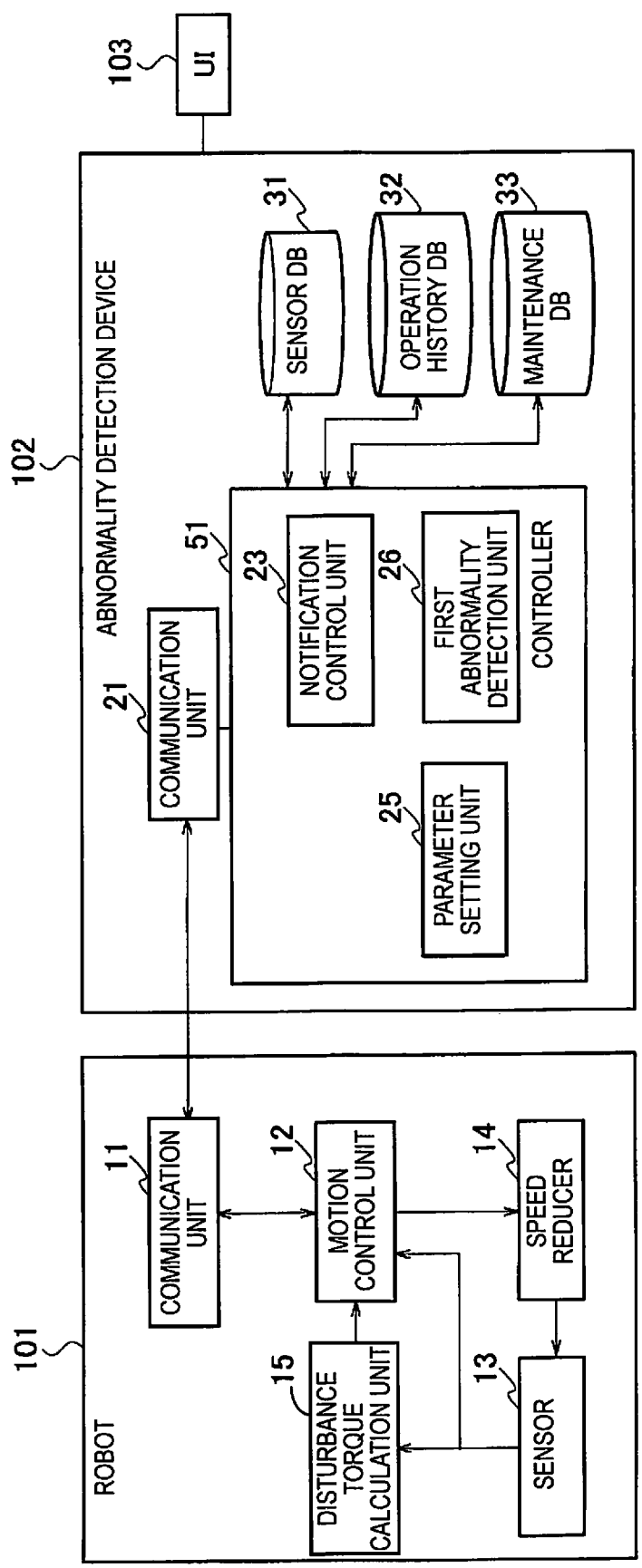
FIG. 1 is a block diagram illustrating configurations of an abnormality detection device 102 and peripheral devices thereof according to a first embodiment.

Embodiments will be described with reference to the drawings. In the descriptions of the drawings, identical parts have been assigned the same reference numerals, and their descriptions have been omitted.

First Embodiment

The configurations of the abnormality detection device 102 according to the first embodiment and peripheral devices (101, 103) thereof will be described with reference to FIG. 1. The abnormality detection device 102 according to the first embodiment is connected to a robot 101 and a user interface 103. The abnormality detection device 102 detects abnormalities of the robot 101 as one example of a device having a movable part. Here, an "abnormality of a device (robot 101)" is a concept that includes device failures as well as various factors that inhibit normal operation the device, such as device operation stoppages, device malfunctions, and deterioration of the lubricating oil. "Detecting an abnormality" includes not only the detection of current abnormalities, but also the prediction of future abnormalities and detecting signs of abnormalities.

The robot 101 as one example of a "device having a movable part" is a production robot having one or two or more joint axes, as an example of a movable part. The robot 101 includes, for example, a production robot or a production device that automatically executes the welding work of a vehicle body. The robot 101 has a plurality of motor drive systems as joint axes. The motor drive system is provided with a servo motor as the drive source for a rotary mechanism, such as a robot arm, and the servo motor drives the robot arm via a speed reducer 14. By operating the servo motor, for example, a welding electrode mounted at the end of the robot arm is brought into contact with an object to be processed, such as a metal blank, for execution of the welding work. The "device having a movable part" includes, in addition to robots that can carry out welding work, robots that can perform various operations, such as pressing, painting, resin molding, and object assembly.

A sensor 13 is attached to the robot 101. Specifically, a torque sensor is built into the speed reducer 14. Instead of the speed reducer, the torque sensor may be built into a motor that is connected to the speed reducer. The sensor 13 repeatedly detects various physical quantities that indicate the state of the robot 101 at a prescribed cycle and outputs time-series data. Various physical quantities (hereinafter, simply "physical quantities") indicating the state of the robot 101 are observed at regular intervals. Physical quantities include various types of data of the motor drive system required for determining abnormalities of the robot 101. Physical quantities include, for example, the rotation angle position, the rotation speed, the power consumption, and the current consumption of the servo motor, the torque value output from the speed reducer 14, and the vibration value of the rotation mechanism of the speed reducer 14. The sensor 13 may be an acceleration sensor that detects the acceleration applied to the servo motor or the joint axis, in which case the detected value of the acceleration is output as time-series data.

The robot 101 is provided with a disturbance torque calculation unit 15 that calculates the disturbance torque generated in the speed reducer 14 from a torque value (torque detection value) detected by the sensor 13. The disturbance torque indicates the difference between a torque command value during control of the speed reducer 14 and the torque detection value detected by the sensor 13. When the speed reducer 14 is normal and is operating stably, the difference between the torque command value and the torque detection value is almost constant, so that the disturbance torque indicates a stable numerical value. If an abnormality occurs in the speed reducer 14, the speed reducer 14 does not operate stably, so that changes occur in the disturbance torque.

The "disturbance torque" is one example of time-series data acquired from the robot 101. Since the torque command value and the torque detection value are both time-series data acquired at regular time intervals, the disturbance torque is likewise time-series data. If the sensor 13 is an acceleration sensor that detects the acceleration applied to the servo motor or the joint axis, the time-series data acquired from the sensor 13 attached to the robot 101 is the "detected value of acceleration."

The robot 101 is further provided with a motion control unit 12 and a communication unit 11. The motion control unit 12 operates the servo motor in accordance with a preset motion program and controls the robot arm and the joint axis mounted on the robot 101 to carry out the desired motion. If the robot 101 is a teaching-playback type robot, the motion control unit 12 operates the servo motor in accordance with a motion program set by teaching. In addition, the motion control unit 12 outputs operation data generated at the time of operating the robot 101 to the communication unit 11.

The communication unit 11 transmits the operation data of the robot 101, the disturbance torque, and various sensor data detected by the sensor 13 to the abnormality detection device 102.

The disturbance torque calculation unit 15 and the motion control unit 12 described above can be implemented by one or two or more arithmetic circuits. The arithmetic circuit can be realized by a general-purpose microcomputer equipped with a CPU and memory, an application-specific integrated circuit (ASIC), or a conventional electronic circuit.

The abnormality detection device 102 includes a communication unit 21 that carries out communication with the robot 101, a control unit 51, a sensor database 31, an operating history database 32, and a maintenance database 33.

The communication unit 21 carries out communication between the robot 101 and the communication unit 11, and sends and receives data. Specifically, the communication unit 21 receives operation data, disturbance torque, and various sensor data from the robot 101. The communication unit 21 is one example of a "sensor signal input unit." The communication unit 21 carries out wired or wireless communication. For example, the communication unit 21 is connected to the communication unit 11 by a LAN cable or connected to the communication unit 11 by near field communication (NFC).

The control unit 51 detects an abnormality of the robot 101 based on data received by the communication unit 21. The control unit 51 can be realized by a general-purpose microcomputer that is provided with a CPU (central processing unit), memories such as RAM and ROM, and an input/output unit. Of course, it is also possible to configure the control unit 51 by preparing dedicated hardware, such as ASIC. In addition, the control unit 51 may be configured by more than one piece of hardware.

The control unit 51 is provided with a first abnormality detection unit 26, a notification control unit 23, and a parameter setting unit 25. The first abnormality detection unit 26 detects an abnormality of the robot 101 based on the disturbance torque received by the communication unit 21.

Specifically, the first abnormality detection unit 26 determines whether disturbance torque ($RD_t$) at a specific time (t) has increased or decreased with respect to disturbance torque ($RD_{t-k}$) from a set period of time before (t–k) the specific time. Cases in which the disturbance torque is increasing and cases in which the disturbance torque is decreasing are respectively indicated by "defined numerical values." The first abnormality detection unit 26 repeatedly carries out the determination of whether the disturbance torque is increasing or decreasing as the specific time (t) is shifted. Thus, the "defined numerical values" become time-series data. The first abnormality detection unit 26 then calculates an integrated value, obtained by integrating the "defined numerical values" over a prescribed period of time, and detects an abnormality of the robot 101 (device) based on the integrated value. Hereinbelow, a plurality of arithmetic processing functions that the first abnormality detection unit 26 has will be described in detail.

Difference Calculation

The first abnormality detection unit 26 first carries out a difference calculation. Specifically, the difference (x) between the disturbance torque ($RD_t$) at a specific time (t) and the disturbance torque ($RD_{t-k}$) from a set period of time before (t-k) the specific time is calculated. Since the first abnormality detection unit 26 calculates the difference (x) as the specific time (t) is shifted, the difference (x) is time-series data. The set period of time (k) is, for example, 30 seconds to 5 minutes.

$$x = RD_t - RD_{t-k} \qquad \text{Equation 1}$$

Classification/Quantification

Next, the first abnormality detection unit 26 carries out a classification/quantification process. Specifically, the first abnormality detection unit 26 determines whether the disturbance torque ($RD_t$) at a specific time (t) has increased or decreased with respect to the disturbance torque ($RD_{t-k}$) from a set period of time before (t-k) the specific time, as the specific time (t) is shifted. The first abnormality detection unit 26 then indicates an increase or a decrease in the disturbance torque, respectively, by "defined numerical values." Since the first abnormality detection unit 26 determines an increase or a decrease as the specific time (t) is shifted, the "defined numerical values" that indicate an increase or decrease are also time-series data. For example, as shown in Equation (2), an increase in the disturbance torque and a decrease in the disturbance torque are respectively indicated by the "defined numerical values (1, 0, -1)." Here, the first reference value ($p_a$) is a constant numerical value equal to a second reference value ($p_b$) or a constant numerical value greater than the second reference value ($p_b$).

Equation 2

$$f(x) = \begin{cases} 1 & (x > p_a) \\ 0 & (p_a \geq x \geq p_b) \\ -1 & (p_b > x) \end{cases} \qquad (2)$$

When the difference (x) between the disturbance torque ($RD_t$) at a specific time (t) and the disturbance torque ($RD_{t-k}$) from a set period of time before (t-k) the specific time is larger than the first reference value ($p_a$), the first abnormality detection unit 26 determines that the disturbance torque is increasing and outputs "f(x)=1." When the difference (x) is smaller than the second reference value ($p_b$), the first abnormality detection unit 26 determines that the disturbance torque is decreasing and outputs "f(x)=-1." When the difference (x) is less than or equal to the first reference value ($p_a$) and greater than or equal to the second reference value ($p_b$), the first abnormality detection unit 26 determines that the disturbance torque is neither increasing nor decreasing and outputs "f(x)=0."

Equation (3) may be used instead of equation (2). In this case, if the difference (x) is greater than or equal to the first reference value ($p_a$), the first abnormality detection unit 26 determines that the disturbance torque is increasing and outputs "f(x)=1. If the difference (x) is smaller than the first reference value ($p_a$), the first abnormality detection unit 26 determines that the disturbance torque is decreasing and outputs "f(x)=-1." The first abnormality detection unit 26 does not determine that the disturbance torque has neither increased nor decreased and thus outputs "f(x)=0." That is, either an increase or a decrease is determined. In other words, the first abnormality detection unit 26 can encode temporal changes in the disturbance torque, i.e., the difference (x). If the first reference value ($p_a$) is equal to the second reference value ($p_b$), the time variation (x) in the disturbance torque is essentially encoded in the same manner as shown by Equation (3). Thus, "f(x)=0" is only output when the difference (x) is zero.

Equation 3

$$f(x) = \begin{cases} 1 & (x \geq p_a) \\ -1 & (p_a > x) \end{cases} \qquad (3)$$

Post-Processing/Feature Amount Extraction

Next, the first abnormality detection unit 26 carries out post-processing. Specifically, the first abnormality detection unit 26 calculates an integrated value obtained by integrating the "defined numerical values" over a prescribed period of time (integration time). The first abnormality detection unit 26 extracts a moving average (FD1) of the integrated values as a feature amount. The first abnormality detection unit 26 compares the moving average (FD1) of the integrated values with a prescribed threshold range in order to detect an abnormality of the robot 101. That is, when the moving average (FD1) exceeds the threshold range including zero in FIG. 5B, the first abnormality detection unit 26 determines that the robot 101 is abnormal. The prescribed threshold range is set to a range of -1 to +1, including zero.

As described above, the first abnormality detection unit 26 converts the difference (x) of the disturbance torque to "defined numerical values" that are fixed to defined numerical values in advance, regardless of the absolute value thereof, and determines an abnormality of the robot 101 based on the integrated value obtained by integrating the converted "defined numerical values." As a result, the first abnormality detection unit 26 can determine an abnormality in accordance with a continuous increase or decrease in the disturbance torque, that is, a continuous tendency (trend), without depending on the absolute value of the difference (x) of the disturbance torque. Thus, even if the range of variation in noise and torque detection values is large, a failure of the robot 101 can be accurately detected from the disturbance torque, which changes continuously, without overlooking small, continuous increases or decreases.

The notification control unit 23 notifies the user of the robot 101 of an abnormality of the robot 101 detected by the first abnormality detection unit 26. Specifically, the result of an abnormality determination or a warning thereof is displayed or issued to a mobile communication device such as a tablet terminal or a smartphone in the possession of the user.

The parameter setting unit 25 sets various parameters used for the abnormality determination process carried out by the first abnormality detection unit 26. Specifically, the parameter setting unit 25 sets the "set period of time (k)" in the difference calculation, the "first reference value ($p_a$)" and the "second reference value ($p_b$)" in the classification/quantification process, the "integration time" in the post-processing, and the "prescribed threshold range" in the feature amount extraction process. When setting these parameters, the parameter setting unit 25 may use machine learning such as ensemble learning to optimize these parameters.

The sensor database 31 is a storage device that temporarily stores the disturbance torque received by the communication unit 21. The sensor data is not limited to disturbance torque data, but also includes various detected physical quantities that indicate the state of the robot 101, including rotation angle position, rotary speed, power consumption, and current consumption of the servo motor and the value of vibration generated in the rotation mechanism of the speed reducer 14, which are stored in the sensor database 31. During detection of an abnormality, the first abnormality detection unit 26 reads the disturbance torque stored in the sensor database 31.

The operation history database 32 is a storage device that temporarily stores the operation data received by the communication unit 21. The operation history database 32 stores various data related to the operation of the device as the operation data, including the operation date of the robot 101, operation start time, operation stop time, and the number of hours of continuous operation.

When maintenance is performed on a robot 101 in which an abnormality has occurred, or for which the occurrence of an abnormality has been predicted, the maintenance database 33 stores the maintenance data indicating the content of the maintenance. The maintenance data can be input by an operator of the robot 101 by using a user interface (UI) 103. The maintenance data include the identification number of the robot 101 for which maintenance was performed, the date and time when the maintenance was performed, and the content of the maintenance (parts replacement, repair, lubrication, etc.).

The user interface (UI) 103 is a mobile communication device, such as a tablet terminal or a smartphone, and has an operation function for the user to carry out various input operations and a presentation function for presenting various data to the user. The user interface (UI) 103 displays or sounds an alarm issued by the notification control unit 23, or notifies the user, visually or audibly, of the result of an abnormality determination or of a warning of an abnormality sent by the notification control unit 23.

One example of an abnormality detection method using the abnormality detection device 102 of FIG. 1 will be described with reference to FIG. 2. First, in Step S01, the communication unit 21 receives, from the communication unit 11 of the robot 101, the disturbance torque calculated by the disturbance torque calculation unit 15 and the sensor 13 attached to the robot 101.

In Step S02, the first abnormality detection unit 26 detects an abnormality of the robot 101 based on the disturbance torque received by the communication unit 21. The detailed procedure of Step S02 will be described further below with reference to FIGS. 3 and 4.

Figure 2:
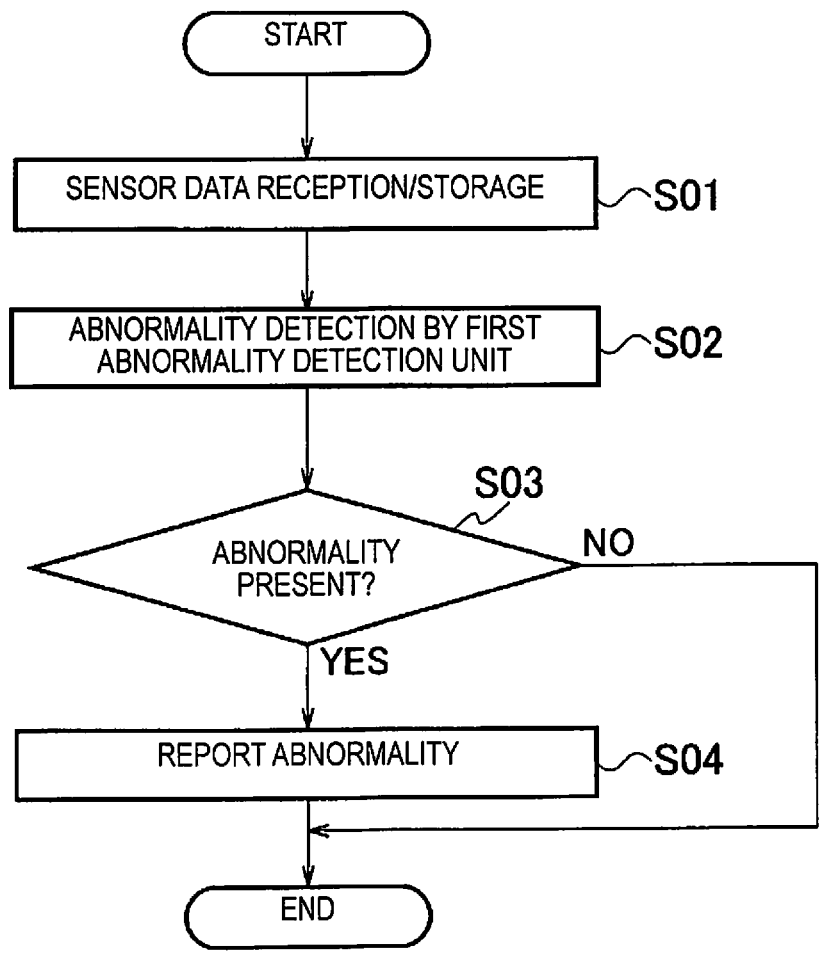
FIG. 2 is a flowchart illustrating one example of the operation of the abnormality detection device of FIG. 1.

If an abnormality of the robot 101 is detected by the first abnormality detection unit 26 (YES in Step S03), the process proceeds to Step S04 and the notification control unit 23 notifies the user of the robot 101 of the abnormality of the robot 101 detected by the first abnormality detection unit 26, and the process of the flowchart of FIG. 2 comes to an end. If an abnormality is not detected in the robot 101 by the first abnormality detection unit 26 (NO in Step S03), Step S04 is not executed, and the process of flowchart of FIG. 2 comes to an end.

Abnormality Detection Method by the First Abnormality Detection Unit 26 (Part 1)

Figure 3:
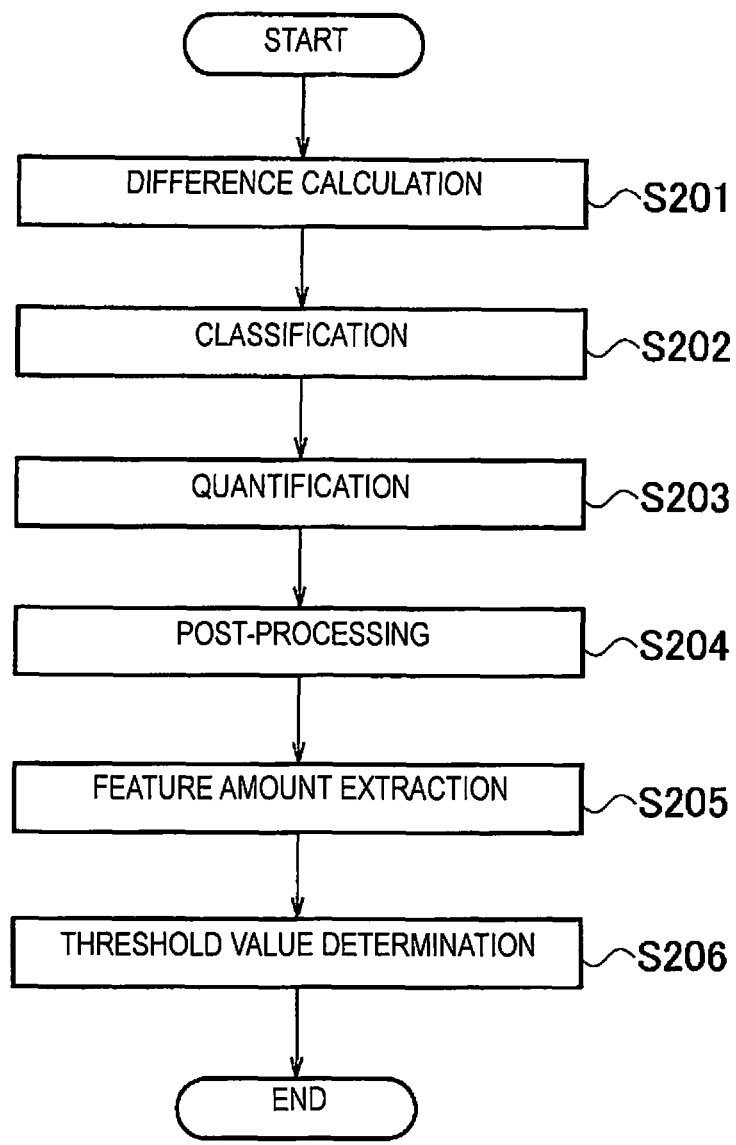
FIG. 3 is a flowchart illustrating one example of the detailed procedure of Step S02 of FIG. 2.

One example of the detailed procedure of Step S02 of FIG. 2 will be described with reference to FIG. 3. First, in Step S201, the first abnormality detection unit 26 first carries out a difference calculation. Specifically, as shown in Equation (1), the difference (x) between the disturbance torque ($RD_t$) at a specific time (t) and the disturbance torque ($RD_{t-k}$) from a set period of time before (t–k) the specific time, as the specific time (t) is shifted, is continually calculated.

In Step S202, the first abnormality detection unit 26 categorizes the difference (x). Specifically, in accordance with Equation (2), the first abnormality detection unit 26 sorts the difference (x) into one of the following <Category 1> to <Category 3>.

<Category 1> greater than the first reference value ($p_a$),
<Category 2> less than the second reference value ($p_b$),
<Category 3> less than or equal to the first reference value ($p_a$) and greater than or equal to the second reference value ($p_b$).

<Category 1> indicates that the disturbance torque ($RD_t$) at a specific time (t) has increased with respect to the disturbance torque ($RD_{t-k}$) from a set period of time before (t–k) the specific time, <Category 2> indicates that it has decreased, and <Category 3> indicates that it has neither increased nor decreased.

In Step S203, the first abnormality detection unit 26 quantifies the difference (x) based on the classification result described above. Specifically, the first abnormality detection unit 26 assigns 1, 0, and –1 as the "defined numerical values" with respect to <Category 1> to <Category 3> in accordance with Equation (2). "1" is assigned to a difference (x) classified as <Category 1>, "–1" is assigned to a difference (x) classified as <Category 2>, and "0" is assigned to a difference (x) classified as <Category 3>.

In Step S204, the first abnormality detection unit 26 carries out post-processing. Specifically, the first abnormality detection unit 26 calculates an integrated value, obtained by integrating the "defined numerical values" over a prescribed period of time (integration time). In Step S205, the first abnormality detection unit 26 extracts a moving average (FD1) of the integrated values as a feature amount. In Step S206, the first abnormality detection unit 26 compares the moving average (FD1) of the integrated values with a prescribed threshold range in order to detect an abnormality of the robot 101. When the moving average (FD1) exceeds the threshold range in FIG. 5B, the first abnormality detection unit 26 determines that the robot 101 is abnormal.

Abnormality Detection Method by the First Abnormality Detection Unit 26 (Part 2)

Figure 4:
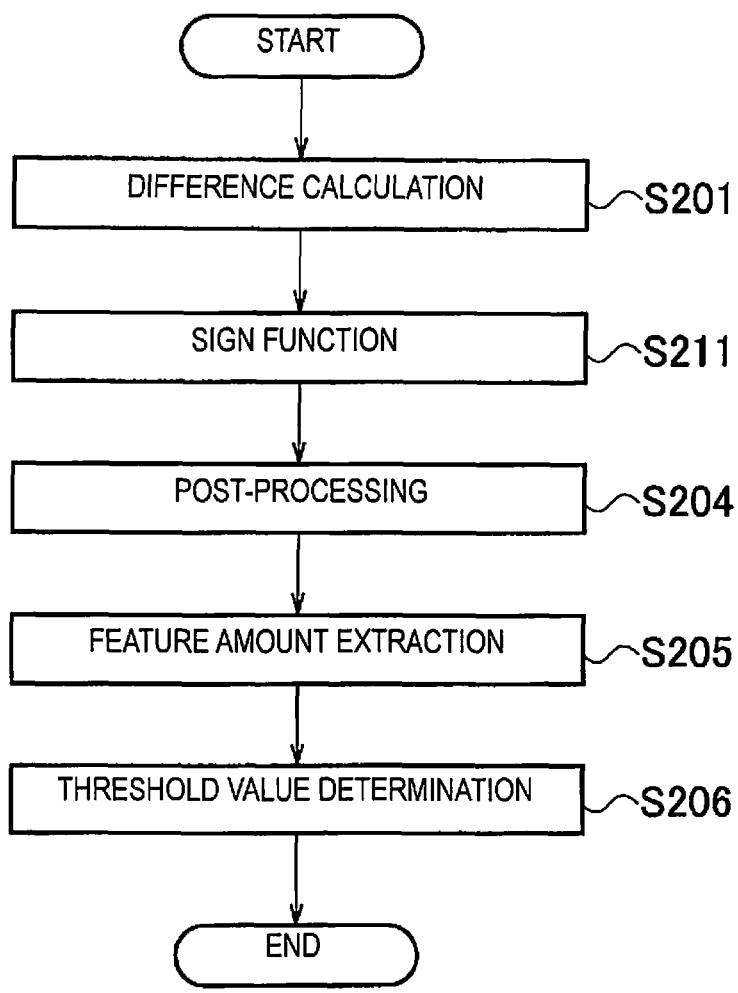
FIG. 4 is a flowchart illustrating another example of the detailed procedure of Step S02 of FIG. 2.

Another example of the detailed procedure of Step S02 of FIG. 2 will be described with reference to FIG. 4. Compared with FIG. 3, the abnormality detection method shown in FIG. 4 is the same as FIG. 3 in steps S201, S204-S206, and is different in that Step S211 is executed instead of S202 and S203 in FIG. 3. Thus, Step S211 will be described.

In Step S211, an encoding process is performed. Specifically, in accordance with Equation (3), the first abnormality detection unit 26 classifies the difference (x) into the following <Category 4> or <Category 5>.

<Category 4> equal to the first reference value ($p_a$) or larger than the first reference value ($p_a$), <Category 5> smaller than the first reference value ($p_a$).

<Category 4> indicates that the disturbance torque ($RD_t$) at a specific time (t) has increased with respect to the disturbance torque ($RD_{t-k}$) from a set period of time before (t−k) the specific time, and <Category 5> indicates that it has decreased. With regard to <Category 3>, in Step S211 the determination result of "neither increasing nor decreasing" does not exist, unlike in Step S204.

The first abnormality detection unit 26 then encodes the difference (x) based on the classification result described above. Specifically, the first abnormality detection unit 26 assigns 1 and −1 as the "defined numerical values" with respect to <Category 4> and <Category 5>, in accordance with Equation (3). "1" is assigned to a difference (x) classified as <Category 4> and "−1" is assigned to a difference (x) classified as <Category 5>.

In this manner, the time variation of the disturbance torque is sorted into three categories (increase/decrease/no change) or two categories (increase/decrease), and "defined numerical values" are assigned to the categories. As a result, it is possible to quantify or encode a continuous trend without depending on the magnitude of the time variation of the disturbance torque. Of course, the numbers (three and two) of categories indicated here are only examples and no limitation is imposed thereby. For example, it is possible to use four or five categories in accordance with an equation different from Equations (2) and (3). In addition, the "1," "−1," and "0" assigned to each of the categories (increase/decrease/no change) are examples, and other numerical values may be used as long as they are predefined constant values.

As described above, the following actions and effects can be achieved by the first embodiment.

An abnormality of a device can be detected by specifying a pattern that is different from usual in the time-series data output from the target object (device). In general, time-series data extracted using a sensor mounted on a device have various characteristic patterns that do not correspond to abnormalities (referred to here as noise) together with characteristic patterns that do correspond to abnormalities.

In industrial machines such a vehicles and production equipment as the target objects (device), machine damage and temporal changes such as wear and deterioration occur. For this reason, routine maintenance such as regular inspections and parts replacements is carried out in order to prevent stoppages due to sudden failures of production equipment and industrial machinery. However, once stoppages due to failure occur in production equipment or industrial machinery, it becomes necessary to investigate the cause, procure or manufacture replacement parts, or to carry out a large-scale repairs, resulting in long downtimes of the production equipment or industrial machinery.

For example, an extremely large number of robots are used in the production of automobiles. If even one of these robots were to fail, part or all of the production line may stop for a long period of time and cause serious losses. It is necessary to accurately detect robot abnormalities in order to prevent such a prolonged production stoppages.

An articulated robot having a plurality of joint axes used in a production line has a speed reducer on the joint axes. There is a method to detect abnormalities using disturbance torque, which is the difference between the control command value and the measured value of the torque as a failure diagnosis parameter of the speed reducer, utilizing data from a torque sensor built into the speed reducer. In this method, statistical parameters such as the mean and the variance for a prescribed period of the disturbance torque are calculated, preset threshold values are compared, and abnormalities are determined to predict failures.

However, the disturbance torque fluctuates significantly due to various factors such as the effect of changes in the viscosity of lubricants and the effects of maintenance that may change robot operation. On the other hand, the range of fluctuation of the disturbance torque due to the occurrence of an abnormality is often narrow. Therefore, if the allowable range is set wide, abnormalities that must be detected may be overlooked. On the other hand, if the allowable range is too restricted, normal operation might be mistakenly determined to be an abnormality.

In the abnormality determination device and the abnormality detection method according to the first embodiment, whether the disturbance torque ($RD_t$) at a specific time (t) has increased or decreased with respect to the disturbance torque ($RD_{t-k}$) from a set period of time before (t−k) the specific time, is determined as the specific time (t) is shifted, and an increase or decrease of the disturbance torque is respectively indicated by defined numerical values, and an abnormality of the robot 101 is detected based on an integrated value obtained by integrating the defined numerical values. As a result, it is possible to detect continuous changes regardless of the magnitude of the range of fluctuation of the time-series data (disturbance torque). Thus, it is possible to accurately extract small, continuous changes in the disturbance torque from a large variation range of sensor signals and noise, in order to accurately detect a failure of the robot 101.

Figure 5A:
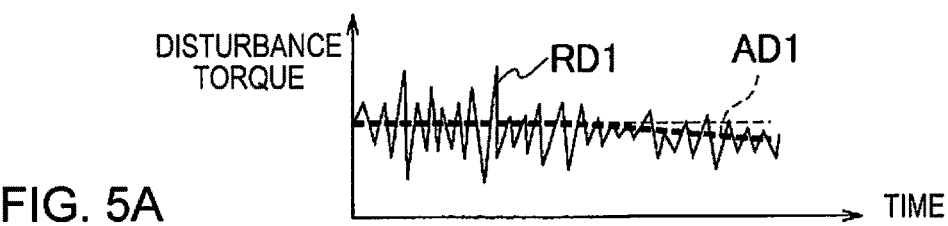
FIG. 5A is a graph illustrating the time variation of the disturbance torque (RD1) and the moving average (AD1) of the disturbance torque (RD1).
Figure 5B:
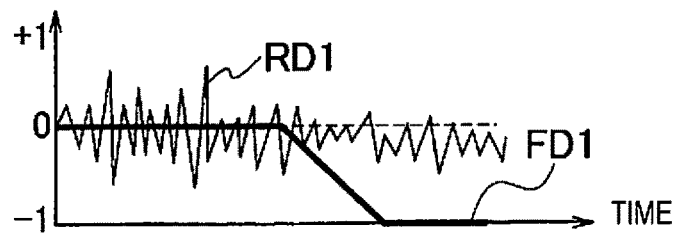
FIG. 5B is a graph illustrating the time variation of the disturbance torque (RD1) and the time variation of moving average (FD1) of the integrated value calculated from the disturbance torque (RD1).

As shown in FIG. 5A, if the disturbance torque (RD1) is slightly but continuously decreasing, even if the disturbance torque (RD1) or its moving average (AD1) is compared with the threshold value, it is difficult to extract the small, continuous decrease in the disturbance torque (RD1) or its moving average (AD1). This is because the noise is greater than the small fluctuation range. In contrast, as shown in FIG. 5B, a continuous change in the disturbance torque (RD1) is replaced with "defined numerical values" and the integrated value (FD1) of the "defined numerical values" is compared with a threshold value, whereby it is possible to extract the small, continuous decrease in the disturbance torque (RD1) or its moving average (AD1).

Figure 5C:
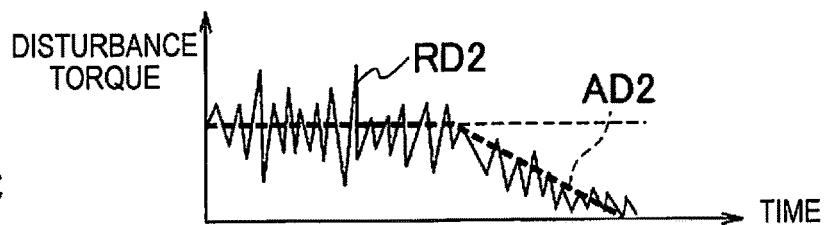
FIG. 5C is a graph illustrating the time variation of the disturbance torque (RD2) and the moving average (AD2) of the disturbance torque (RD2).
Figure 5D:
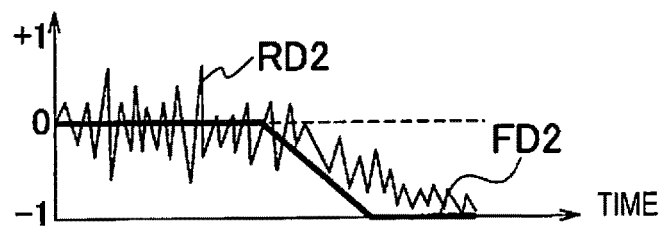
FIG. 5D is a graph illustrating the time variation of the disturbance torque (RD2) and the time variation of the moving average (FD2) of the integrated value calculated from the disturbance torque (RD2).

In addition, as shown in FIG. 5C, in the case that the disturbance torque (RD1) decreases significantly, if the decrease is continuous, it can be determined that the decrease is not noise. Thus, as shown in FIG. 5D, it is possible to compare the integrated value (FD2) of the "defined numerical values" with the threshold value in order to extract the continuous decrease in the disturbance torque (RD2) or its moving average (AD2).

Figure 5E:
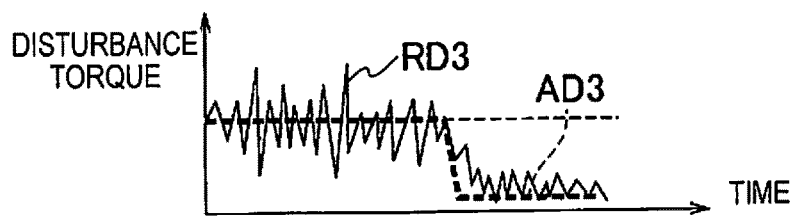
FIG. 5E is a graph illustrating the time variation of the disturbance torque (RD3) and the moving average (AD3) of the disturbance torque (RD3).
Figure 5F:
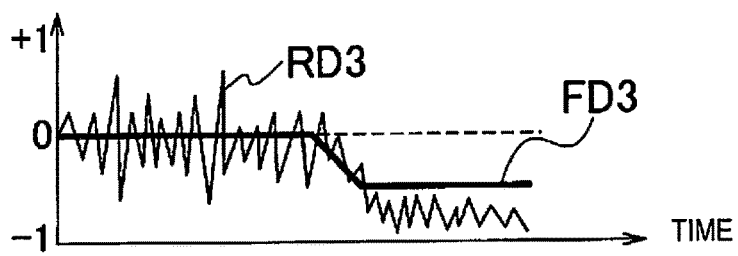
FIG. 5F is a graph illustrating the time variation of the disturbance torque (RD3) and the time variation of the moving average (FD3) of the integrated value calculated from the disturbance torque (RD3).

On the other hand, as shown in FIG. 5E, even in a case that the disturbance torque (RD3) decreases significantly, if the decrease is temporary and not continuous, the decrease may be noise. In this case, as shown in FIG. 5F, the range of variation of the integrated value (FD3) is smaller compared to FIGS. 5B and 5D. Thus, the first abnormality detection unit 26 can compare the integrated value (FD3) with the threshold value in order to eliminate temporary decreases in the disturbance torque (RD3) or its moving average (AD3). Thus, the first abnormality detection unit 26 regards a temporary decrease in the disturbance torque (RD3), as shown in FIG. 5E, as noise rather than an abnormality, regardless of the magnitude of the decrease.

The first abnormality detection unit 26 determines an increase when the difference (x) between the disturbance torque ($RD_t$) at a specific time (t) and the disturbance torque ($RD_{t-k}$) from a set period of time before (t−k) the specific time is greater than the first reference value ($p_a$). The first abnormality detection unit 26 determines a decrease when the difference (x) is the same as the first reference value ($p_a$) or smaller than the second reference value ($p_b$), which is smaller than the first reference value ($p_a$). It is possible to use the difference (x) to determine an increase/decrease in the disturbance torque.

The first abnormality detection unit 26 may further determine that the disturbance torque ($RD_t$) at a specific time (t) has neither increased nor decreased with respect to the disturbance torque ($RD_{t-k}$) from a set period of time before (t-k) the specific time, and indicate that it is neither an increase nor a decrease using a defined numerical value. The noise portion of the disturbance torque can thus be removed.

When the difference (x) is less than or equal to the first reference value ($p_a$) and greater than or equal to the second reference value ($p_b$), the first abnormality detection unit 26 determines that the disturbance torque has neither increased nor decreased. The difference (x) can thus be used to determine an increase/decrease in the disturbance torque.

The defined numerical values are fixed to preset values, regardless of the absolute value of the difference (x). As a result, it is possible to detect not only large changes but also small, continuous changes in the disturbance torque.

As shown in Equation (2), the defined numerical value (f(x)=1) that indicates that the disturbance torque ($RD_t$) at a specific time (t) has increased with respect to the disturbance torque ($RD_{t-k}$) from a set period of time before (t-k) the specific time, and the defined numerical value (f(x)=-1) that indicates that the disturbance torque ($RD_t$) at a specific time (t) has decreased with respect to the disturbance torque ($RD_{t-k}$) from a set period of time before (t-k) the specific time have the same absolute value but different signs. It is possible to extract only an increasing or decreasing trend and exclude the magnitude of the increase or decrease.

The first abnormality detection unit 26 extracts the moving average (FD1) of the integrated values as a feature amount in the feature amount extraction process of Step S205. The first abnormality detection unit 26 then detects an abnormality of the robot 101 based on the moving average (FD1) of the integrated values. It is possible to accurately extract small, continuous changes in the disturbance torque in order to accurately detect a failure of the robot 101.

The parameter setting unit 25 uses machine learning such as ensemble learning to optimize the first reference value and the second reference value. It is thereby possible to optimize the range of the disturbance torque that is neither increasing nor decreasing. The parameter setting unit 25 may optimize the length of time for taking the moving average of the integrated values using machine learning such as ensemble learning.

Modified Example

In the difference calculation (Step S201), the first abnormality detection unit 26 may calculate the moving average of the disturbance torque and continually calculate the difference (x') between the moving average of the disturbance torque at a specific time (t) and the moving average of the disturbance torque from a set period of time before (t-k) the specific time as the specific time (t) is shifted. That is, it is possible to use the moving average of the disturbance torque (RD) instead of using the disturbance torque (RD) itself. For example, as shown in FIGS. 5A, 5C, and 5E, it is possible to use moving averages (AD1, AD2, AD3) from which noise components have been removed instead of disturbance torques (RD1, RD2, RD3) with large noise components to calculate the difference (x'). Since the noise component can be removed from the difference (x'), it is possible to more accurately detect a failure. The parameter setting unit 25 may optimize the length of time for taking the moving average of the disturbance torque using machine learning such as ensemble learning.

Second Embodiment

Figure 6:
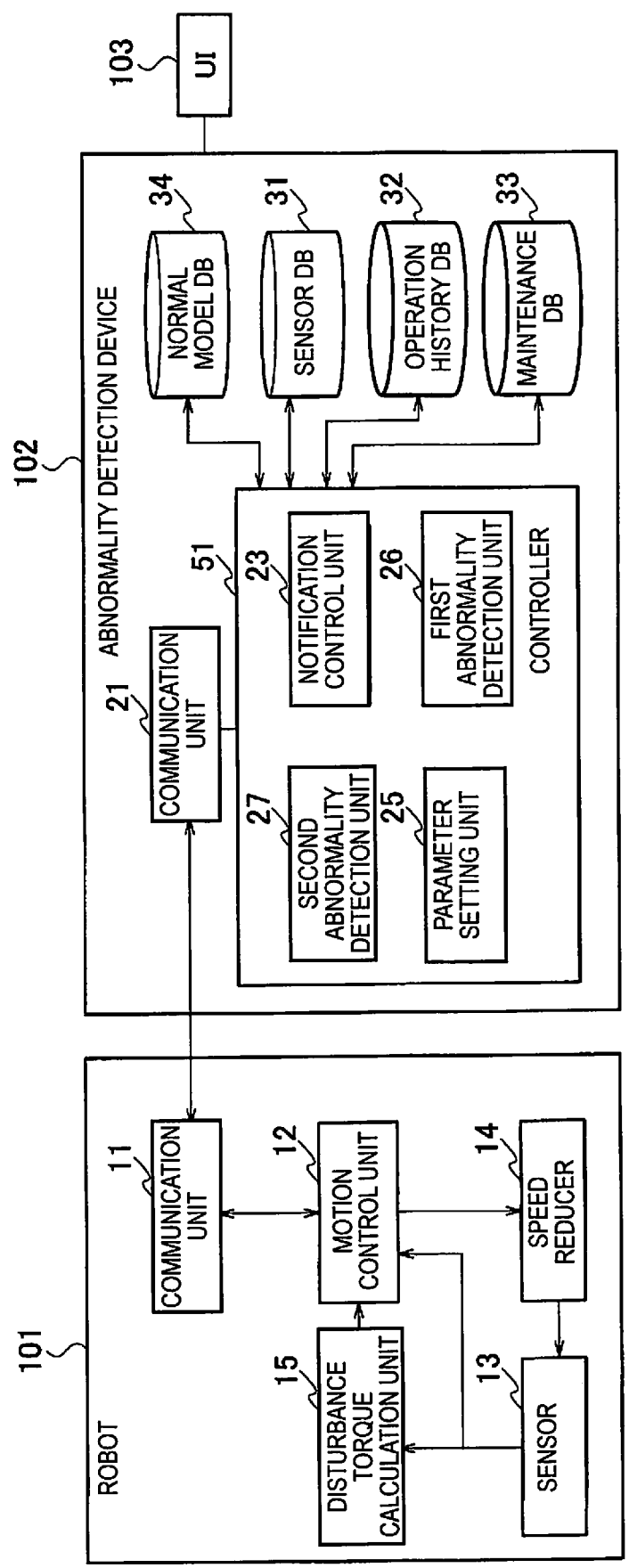
FIG. 6 is a block diagram illustrating configurations of an abnormality detection device and peripheral devices thereof according to a second embodiment.

In the second embodiment, an abnormality detection device and an abnormality detection method in which two different abnormality detection algorithms are combined will be described. As shown in FIG. 6, the abnormality detection device 102 according to the second embodiment is different from the abnormality detection device 102 of FIG. 1 in the following two respects. First, the control unit 51 further comprises the second abnormality detection unit 27. Second, the abnormality detection device 102 further comprises a normal model database 34.

The second abnormality detection unit 27 detects an abnormality of the robot 101 by using an abnormality detection algorithm unlike that of the first abnormality detection unit 26. The abnormality detection algorithm of the second abnormality detection unit 27 may be any known algorithm.

Abnormality Detection Using a Probability Distribution

For example, the second abnormality detection unit 27 can detect an abnormality based on the probability distribution (including the probability density distribution) of the disturbance torque. The second abnormality detection unit 27 reads the disturbance torque (time-series data) for a prescribed period from the sensor database 31 and calculates the probability distribution based on the read disturbance torque. Specifically, the second abnormality detection unit 27 sets a period from the present to a set period of time (for example, 12 hours) prior as the prescribed period and uses, for example, a well-known kernel density estimation method to calculate the probability distribution of the disturbance torque for the prescribed period.

A normal model for evaluation in which the average value of the disturbance torque is set to zero is stored in the normal model database 34. Examples of methods for creating a normal model for evaluation include using a normal distribution, a t-distribution and the mean and variance. A histogram may also be used. The second abnormality detection unit 27 compares the probability distribution of the disturbance torque with the normal model for evaluation in order to calculate the probability density ratio as the feature amount. The second abnormality detection unit 27 compares the probability density ratio with a threshold value in order to determine an abnormality.

Figure 9A:
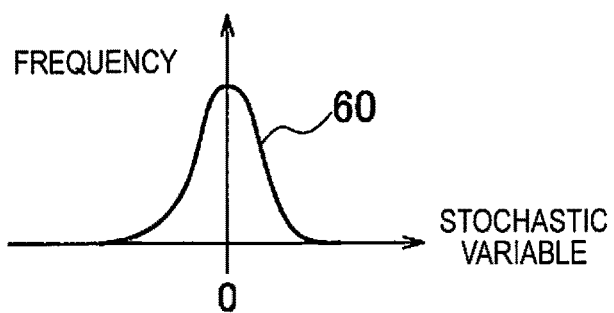
FIG. 9A is a graph illustrating one example of a normal model for evaluation stored in a normal model database.
Figure 9B:
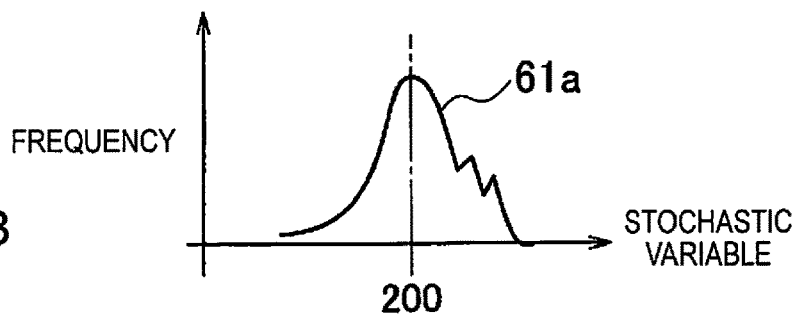
FIG. 9B is a graph showing one example of a probability distribution of the disturbance torque calculated by a second abnormality detection unit.
Figure 9C:
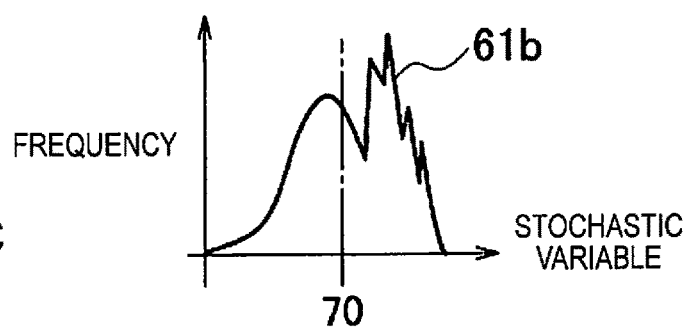
FIG. 9C is a graph showing another example of a probability distribution of the disturbance torque calculated by the second abnormality detection unit.
Figure 9D:
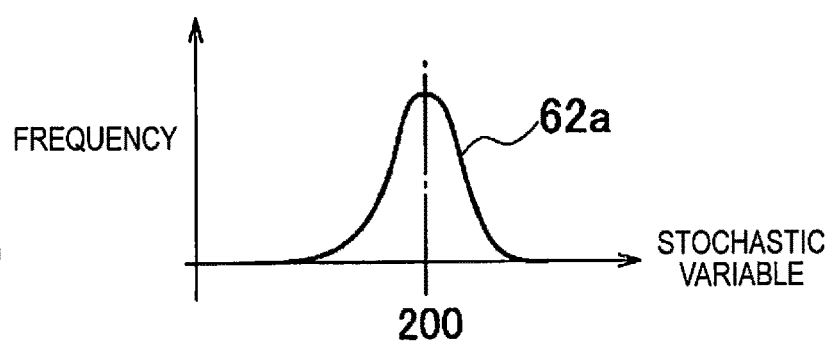
FIG. 9D is a graph illustrating a corrected normal model for evaluation, in which the average value of the normal model for evaluation of FIG. 9A has been corrected to match the average value of the probability distribution of FIG. 9B.
Figure 9E:
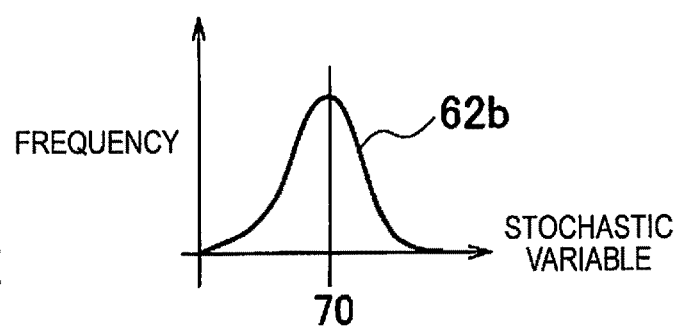
FIG. 9E is a graph illustrating a corrected normal model for evaluation, in which the average value of the normal model for evaluation of FIG. 9A has been corrected to match the average value of the probability distribution of FIG. 9C.

FIG. 9A shows one example of the normal model for evaluation 60 stored in the normal model database 34. FIG. 9B shows one example of the probability distribution 61a of the disturbance torque calculated by the second abnormality detection unit 27. As shown in FIG. 9D, the second abnormality detection unit 27 corrects the average value of the normal model for evaluation 60 to match the average value (200) of the probability distribution 61a. The corrected normal model for evaluation 62a is compared with the probability distribution 61a, and an abnormality is determined when the difference between the two is greater than a prescribed value. For example, the probability distribution 61a of FIG. 9B has no significant deviations from the corrected normal model for evaluation 62a shown in FIG. 9D; thus, it is determined that there are no abnormalities. On the other hand, the probability distribution 61b of FIG. 9C has significant deviations with respect to the corrected normal model for evaluation 62b of FIG. 9E; thus, it is determined that there are abnormalities.

Abnormality Detection Using Degree of Abnormality

Alternatively, the second abnormality detection unit 27 may detect an abnormality based on the degree of abnormality (G(r)) of the disturbance torque defined by Equation (4). In Equation (4), m is the sample mean of the disturbance torque, s is the standard deviation of the disturbance torque, and r is the disturbance torque. The second abnormality detection unit 27 determines that there is an abnormality when the degree of abnormality (G(r)) of the disturbance torque exceeds a prescribed threshold value.

Equation 4

$$G(r) = \frac{(r-m)^2}{2 \cdot s^2} \quad (4)$$

The second abnormality detection unit 27 may also use another known abnormality detection algorithm instead of the abnormality detection algorithm using a probability distribution or the degree of abnormality described above to detect an abnormality of the robot 101.

In this manner, the abnormality detection device 102 according to the second embodiment combines the result of the abnormality detection from the first abnormality detection unit 26 and the result of abnormality detection from the second abnormality detection unit 27 to output a single detection result. A series-type and a parallel-type will be described as examples of types of combinations of detection results.

Series-Type

The first abnormality detection unit 26 or the second abnormality detection unit 27 detects an abnormality of the robot 101 based on time-series data taken at the time of occurrence, or during a time period that includes the time of occurrence, of an abnormality detected by the second abnormality detection unit 27 or the first abnormality detection unit 26. First, one of either the first abnormality detection unit 26 or the second abnormality detection unit 27, detects an abnormality. The other unit, that is, the second abnormality detection unit 27 in the first instance or the first abnormality detection unit 26 in the second instance, searches for the presence or absence of an abnormality only at the time of occurrence or during a time period that includes the time of occurrence of the abnormality detected by the one unit that is not itself. The other unit, that is, the second abnormality detection unit 27 or the first abnormality detection unit 26 does not search for the presence or absence of an abnormality at those times or time periods in which the one unit that is not itself has not detected an abnormality.

One example of a series operation of the abnormality detection device 102 of FIG. 6 will be described with reference to FIG. 7. First, in Step S01, the communication unit 21 receives from the communication unit 11 of the robot 101 the disturbance torque calculated by the disturbance torque calculation unit 15 and the sensor 13 attached to the robot 101.

In Step S51, the first abnormality detection unit 26 detects an abnormality of the robot 101 based on the disturbance torque received by the communication unit 21. The detailed procedure of Step S51 is the same as the detailed procedure of Step S02 described with reference to FIG. 3 or 4, so that a description thereof will be omitted.

If an abnormality of the robot 101 is detected by the first abnormality detection unit 26 (YES in Step S52), the process proceeds to Step S54 and the control unit 51 sets the time at which, or the time period during which, the abnormality was detected by the first abnormality detection unit 26.

In Step S54, the second abnormality detection unit 27 detects an abnormality of the robot 101 based on the probability distribution or the degree of abnormality of the disturbance torque received by the communication unit 21. At this time, the second abnormality detection unit 27 searches for the presence or absence of an abnormality only at the time or time period in which the abnormality detected by the first abnormality detection unit 26 occurred. The second abnormality detection unit 27 may detect an abnormality of the robot 101 by using another known method instead of the probability distribution or the degree of abnormality of the disturbance torque.

Figure 7:
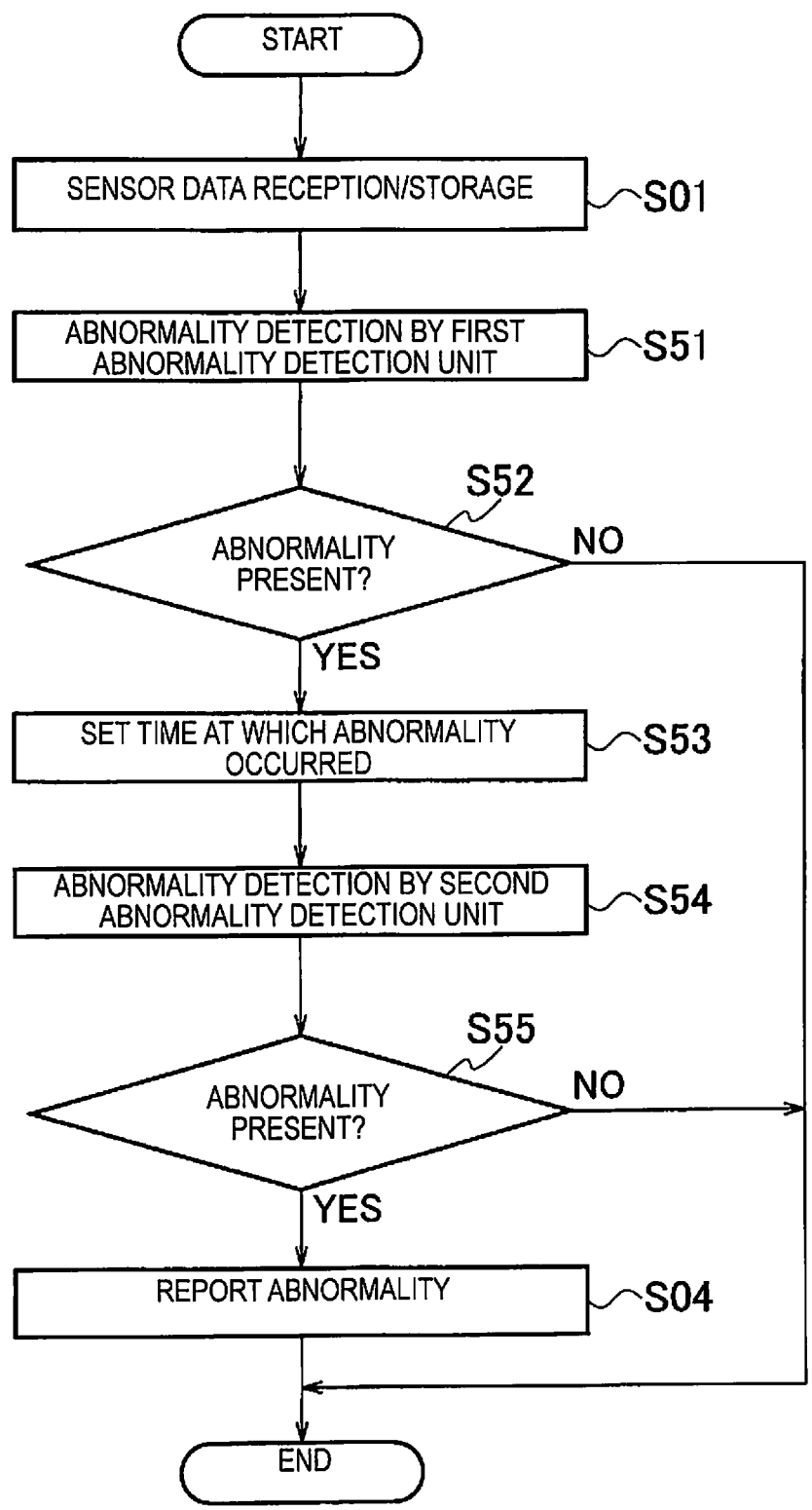
FIG. 7 is a flowchart illustrating one example of a series operation of the abnormality detection device of FIG. 6.

If an abnormality of the robot 101 is detected by the second abnormality detection unit 27 (YES in Step S55), the process proceeds to Step S04 and the notification control unit 23 notifies the user of the robot 101 of the abnormality of the robot 101 detected by both the first abnormality detection unit 26 and the second abnormality detection unit 27, and the process of the flowchart of FIG. 7 comes to an end. If an abnormality of the robot 101 is not detected by the first abnormality detection unit 26 (NO in Step S52), or if an abnormality of the robot 101 is not detected by the second abnormality detection unit 27 (NO in Step S55), Step S04 is not performed and the process of the flowchart of FIG. 7 comes to an end.

In the example of FIG. 7, an example was shown in which the first abnormality detection unit 26 carries out an abnormality determination first, followed by an abnormality determination by the second abnormality detection unit 27, but the order of the execution by the first abnormality detection unit 26 and the second abnormality detection unit 27 may be reversed.

Parallel-Type

Figure 8:
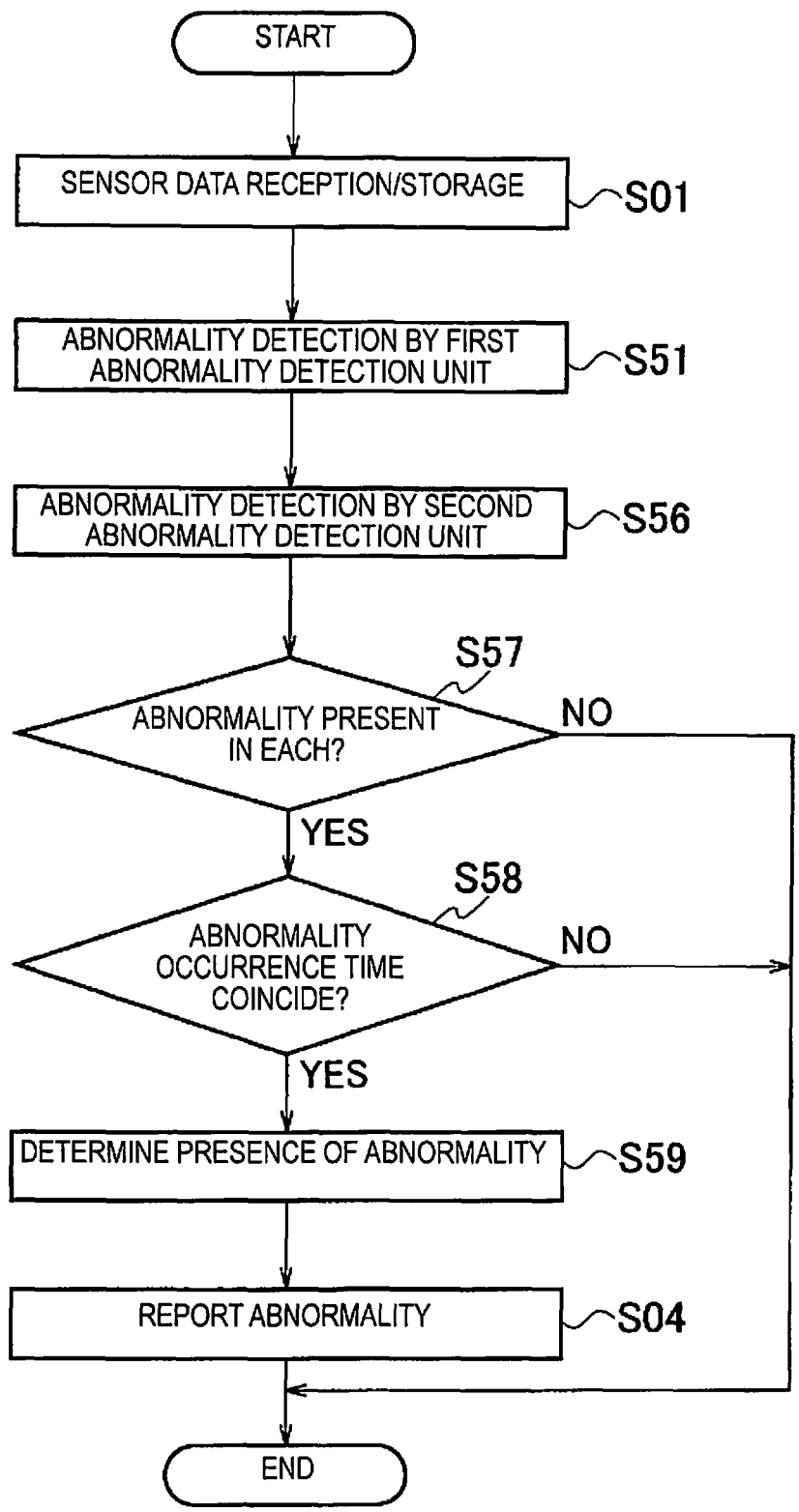
FIG. 8 is a flowchart illustrating one example of a parallel operation of the abnormality detection device of FIG. 6.

The type of combination of the first abnormality detection unit 26 and the second abnormality detection unit 27 is not limited to the series-type described above. For example, the first abnormality detection unit 26 and the second abnormality detection unit 27 may be combined in parallel. That is, the abnormality detection device according to the second embodiment may detect an abnormality by using the parallel operation shown in FIG. 8. FIG. 8 is a flowchart illustrating one example of a parallel operation of the abnormality detection device 102 of FIG. 6.

The notification control unit 23 may carry out a control process to report an abnormality of the robot 101 if the abnormality detected by the first abnormality detection unit 26 and the abnormality detected by the second abnormality detection unit 27 are occurring at the same time or during the same time period. In other words, the abnormality detection device 102 may compare the time of occurrence of an abnormality detected by the first abnormality detection unit 26 and the time of occurrence of an abnormality detected by the second abnormality detection unit 27, and recognize the abnormality as an abnormality of the robot 101 if the times or time periods of occurrence coincide. As a result, the notification control unit 23 can output only an abnormality that is detected by both of two different abnormality detection algorithms. Thus, compared to the first embodiment, over-detection of abnormalities can be reduced.

One example of a parallel operation of the abnormality detection device 102 of FIG. 6 will be described with reference to FIG. 8. First, in Step S01, the communication unit 21 receives, from the communication unit 11 of the robot 101, the disturbance torque calculated by the disturbance torque calculation unit 15 and the sensor 13 attached to the robot 101.

In Step S51, the first abnormality detection unit 26 detects an of the robot 101 based on the disturbance torque received by the communication unit 21. The detailed procedure of Step S51 is the same as that of Step S02 described with reference to FIG. 3 or 4, so that a description thereof will be omitted.

In Step S56, the second abnormality detection unit 27 detects an abnormality of the robot 101 based on the probability distribution or the degree of abnormality of the disturbance torque received by the communication unit 21. At this time, the second abnormality detection unit 27 searches for the presence or absence of an abnormality in the same range as in Step S51 without limiting the time or time period as the target of detection.

If an abnormality of the robot 101 is detected in Step S51 (first abnormality detection unit 26) and in Step S56 (second abnormality detection unit 27) (YES in Step S57), the process proceeds to Step S58, and the control unit 51 determines whether the times or time periods of the occurrences of the abnormalities detected in steps S51 and S56 coincide. Here, "times or time periods coincide" include not only cases in which the times of the occurrences of the abnormalities completely coincide but also cases in which the times of both of the abnormalities detected in steps S51 and S56 belong to the same time period. The length of the time period may be any length less than or equal to 1 minute, for example. The parameter setting unit 25 may optimize the length of the time period using machine learning.

If the times or time periods coincide (YES in S58), the process proceeds to Step S59 and the control unit 51 determines that an abnormality of the robot 101 has occurred. In Step S04, the notification control unit 23 notifies the user of the robot 101 of the abnormality of the robot 101 determined by the control unit 51, and the process of the flowchart of FIG. 8 comes to an end. In the case that an abnormality is not detected in Step S51 and/or Step S56 (NO in Step S57), or, if the times or time periods of the occurrences of the abnormalities detected in steps S51 and S56 do not coincide, Step S04 is not carried out and the process of the flowchart of FIG. 8 comes to an end.

As described above, the notification control unit 23 carries out a control to report an abnormality of the robot 101 detected by combining the first abnormality detection unit 26 and the second abnormality detection unit 27. That is, the notification control unit 23 only outputs an abnormality that is detected by both of the two different abnormality detection algorithms. Thus, compared to the first embodiment, it is possible to reduce the occurrence of normal operations mistakenly determined as abnormalities, i.e., so-called over-detections of abnormalities.

The second abnormality detection unit 27 determines an abnormality of the robot 101 based on the probability distribution of the disturbance torque. It is possible to use different abnormality detection algorithms to accurately detect abnormalities.

In addition, as shown in FIG. 7, the second abnormality detection unit 27 searches for an abnormality of the robot 101 only if an abnormality is detected by the first abnormality detection unit 26 (YES in S52) and only for the time or time period of occurrence of the abnormality detected by the first abnormality detection unit 26. Thus, the arithmetic processing load on the second abnormality detection unit 27 is reduced, and the processing time is shortened.

Further, as shown in FIG. 8, the first abnormality detection unit 26 and the second abnormality detection unit 27 independently detects an abnormality, and the control unit 51 checks the times or time periods of the occurrences of the detected abnormalities in order to ultimately determine the presence or absence of the occurrence of an abnormality. As a result, compared to an abnormality detection device of the first embodiment, which lacks the second abnormality detection unit 27, it is possible to suppress abnormality detection oversights. That is, it is possible to prevent the overlooking of abnormalities that actually occurred.

The parameter setting unit 25 optimizes the length of the time period of Step S58 using machine learning such as ensemble learning. As a result, it is possible to suppress over-detection and improve detection accuracy.

The above-described embodiments are examples of the present invention. Therefore, the present invention is not limited to the above-described embodiments, and it goes without saying that various modifications may be made in accordance with the design, etc., in forms other than these embodiments, without departing from the technical concept of the present invention.

Disturbance torque has been used as an example of time-series data acquired from a device having a movable part, but no limitation is imposed thereby; for example, such data may be acceleration values detected by an acceleration sensor installed on a joint axis, etc. The first abnormality detection unit 26 and the second abnormality detection unit 27 may detect an abnormality of the robot 101 by using the methods described above, by replacing disturbance torque with detected acceleration values.

The invention claimed is:

1. An abnormality detection device comprising:
a sensor installed in an articulated robot having at least one joint axis, the sensor being configured to detect a torque value or an acceleration value related to the at least one joint axis,
a computer including a processor and a storage, the computer being configured to be communicably connected to a user interface and communicably connected to the sensor,
the computer being configured to
acquire a plurality of detection values from the sensor and store the plurality of detection values as time-series data,
read a portion of the time series data corresponding to a prescribed period,
detect an abnormality of the robot based on the portion of the time-series data by executing a first abnormality detection algorithm to calculate an integrated value and detecting the abnormality based on the integrated value, and
control a user interface to report the abnormality detected to a user by causing the user interface to display a warning or sound an alarm,
the first abnormality detection algorithm being configured to execute a plurality of operations with respect to the time series data at each of a plurality of specific times within the prescribed period, each of the plurality of specific times corresponding to a detection value among the plurality of detection values, the plurality of operations including:
determining whether the detection value corresponding to the specific time has increased or decreased with respect to a detection value corresponding to a prior time occurring a set period of time prior to the specific time, assigning a first numerical value as a defined numerical value when the detection value corresponding to the specific time has increased with respect to the detection value corresponding to the prior time such that a difference between the detection value corresponding to the specific time and the detection value corresponding to the prior time is greater than a first reference value, or assigning a second numerical value as the defined numerical value when the detection value corresponding to the specific time has decreased with respect to the detection value corresponding to the prior time such that the difference is smaller than a second reference value that is equal to or smaller than the first reference value, each of the first numerical value and the second numerical value being a fixed preset value with the first numerical value being different from the second numerical value, the first numerical value being different from the first reference value, and the second numerical value being different from the second reference value, and storing the first numerical value or the second numerical value as a defined numerical value in association with the specific time, the first abnormality detection algorithm generating another set of time-series data made up of the defined numerical values stored for each of the plurality of specific times, the first abnormality detection algorithm further including
calculating the integrated value by integrating the plurality of defined numerical values over a prescribed integration time and
detecting the abnormality of the device based on the integrated value.

2. The abnormality determination device according to claim 1, wherein
the first abnormality detection algorithm is further configured to determine whether the detection value at the specific time has neither increased nor decreased with respect to the detection value from the prior time and assign a third numerical value as the defined numerical value when it is determined that the detection value has neither increased nor decreased, the third numerical value being different from the first numerical value and the second numerical value.

3. The abnormality determination device according to claim 1, wherein
the second reference value is smaller than the first reference value, and
the first abnormality detection algorithm is configured to determine that the detection value has neither increased nor decreased when the difference is less than or equal to the first reference value and greater than or equal to the second reference value.

4. The abnormality detection device according to claim 1, wherein
each of the first numerical value and the second numerical value is fixed and does not change regardless of an absolute value of the difference.

5. The abnormality detection device according to claim 1, wherein
the first abnormality detection algorithm is configured to calculate a moving average of the integrated value, and detect the abnormality of the device based on the moving average of the integrated value.

6. The abnormality detection device according to claim 1, wherein
the second reference value is equal to the first reference value, and
the first numerical value and the second numerical value have equal absolute values but different signs.

7. The abnormality detection device according to claim 6, wherein
each of the first numerical value and the second numerical value is fixed and does not change regardless of an absolute value of the difference between the detection value at the specific time and the detection value from the prior time.

8. The abnormality detection device according to claim 6, wherein
the first abnormality detection algorithm is configured to calculate a moving average of the integrated value, and detect the abnormality of the device based on the moving average of the integrated value.

9. The abnormality detection device according to claim 1, wherein
the first abnormality detection algorithm is configured to
calculate a moving average of the detection value at the specific time and at the prior time,
determine whether the moving average of the detection value at the specific time has increased or decreased with respect to the moving average of the detection value from the prior time, and
assign the first numerical value or the second numerical value in accordance with whether the moving average has increased or decreased, respectively.

10. The abnormality detection device according to claim 1, wherein
the computer is further configured to
detect the abnormality of the device by executing a second abnormality detection algorithm that is different from the first abnormality detection algorithm, and
report the abnormality of the device detected by a combination of the first abnormality detection algorithm and the second abnormality detection algorithm.

11. The abnormality detection device according to claim 10, wherein
the second abnormality detection algorithm is configured to detect the abnormality of the device based on a probability distribution of the time-series data.

12. The abnormality detection device according to claim 10, wherein
the computer is configured to execute the second abnormality detection algorithm to detect the abnormality of the device upon the abnormality being detected by the first abnormality detection algorithm, the second abnormality detection algorithm being executed based on time-series data corresponding to a time or during a time period that includes a time when the abnormality was detected by the first abnormality detection algorithm.

13. The abnormality detection device according to claim 12, wherein
the computer is further configured to optimize a length of the time period using machine learning.

14. The abnormality detection device according to claim 10, wherein
the computer is configured to report the abnormality of the device upon the abnormality being detected by the first abnormality detection algorithm and the abnormality being detected by the second abnormality detection algorithm at a same time or during a same time period.

15. The abnormality detection device according to claim 1, wherein the computer is further configured to optimize the first reference value and the second reference value using machine learning.

16. The abnormality detection device according to claim 1, wherein the first numerical value and the second numerical value have equal absolute values but different signs.

17. The abnormality detection device according to claim 16, wherein the first numerical value is +1 and the second numerical value is −1.

18. An abnormality detection method, comprising using a computer including a processor and a storage to
communicate with a sensor installed in an articulated robot having at least one joint axis to acquire a plurality of detection values from the sensor and store the plurality of detection values as time-series data, the sensor being configured to detect a torque value or an acceleration value related to the at least one joint axis,
read a portion of the time series data corresponding to a prescribed period,
detect an abnormality of the device based on the time-series data by executing a first abnormality detection algorithm, and
report the abnormality detected to a user by controlling a user interface to cause the user interface to display a warning or sound an alarm; and in accordance with the first abnormality detection algorithm, causing the computer to execute a plurality of operations with respect to the time series data at each of a plurality of specific times within the prescribed period, each of the plurality of specific times corresponding to a detection value among the plurality of detection values, the plurality of operations including:

determining whether the detection value corresponding to the specific time has increased or decreased with respect to a detection value corresponding to a prior time occurring a set period of time prior to the specific time, assigning a first numerical value as a defined numerical value when the detection value corresponding to the specific time has increased with respect to the detection value corresponding to the prior time such that a difference between the detection value corresponding to the specific time and the detection value corresponding to the prior time is greater than a first reference value, or assigning a second numerical value as the defined numerical value when the detection value corresponding to the specific time has decreased with respect to the detection value corresponding to the prior time such that the difference is smaller than a second reference value that is equal to or smaller than the first reference value, each of the first numerical value and the second numerical value being a fixed preset value with the first numerical value being different from the second numerical value, the first numerical value being different from the first reference value, and the second numerical value being different from the second reference value, and storing the first numerical value or the second numerical value as a defined numerical value in association with the specific time, the first abnormality detection algorithm generating another set of time-series data made up of the defined numerical values stored for each of the plurality of specific times, the first abnormality detection algorithm being further configured to calculate an integrated value by integrating the plurality of defined numerical values over a prescribed integration time, and determine whether the abnormality exists based on the integrated value.

* * * * *